Aug. 28, 1962         H. R. BOHANON           3,051,072
              AIR CIRCULATING AND MIXING FAN
Filed March 20, 1961                    2 Sheets-Sheet 1
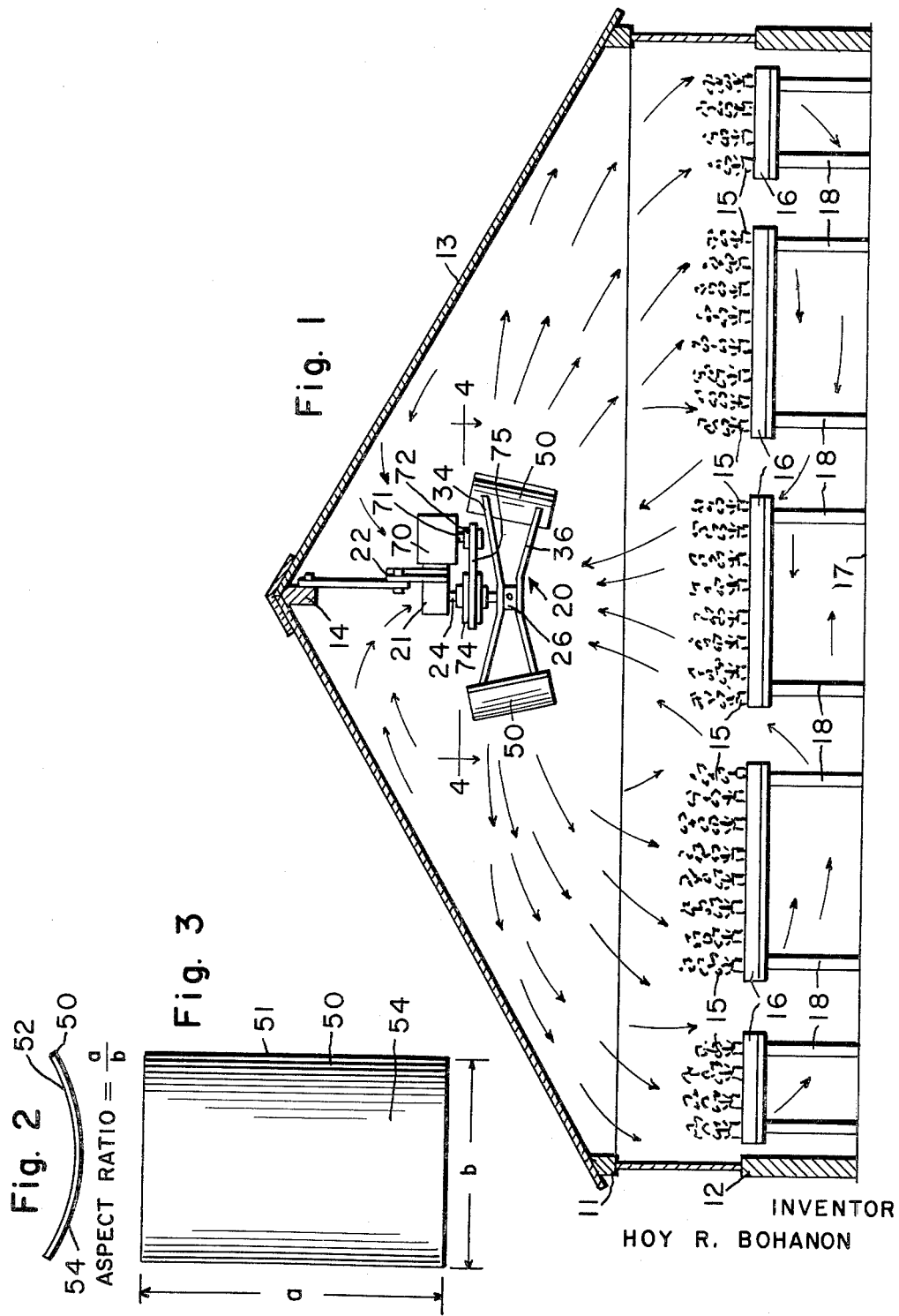
INVENTOR
HOY R. BOHANON

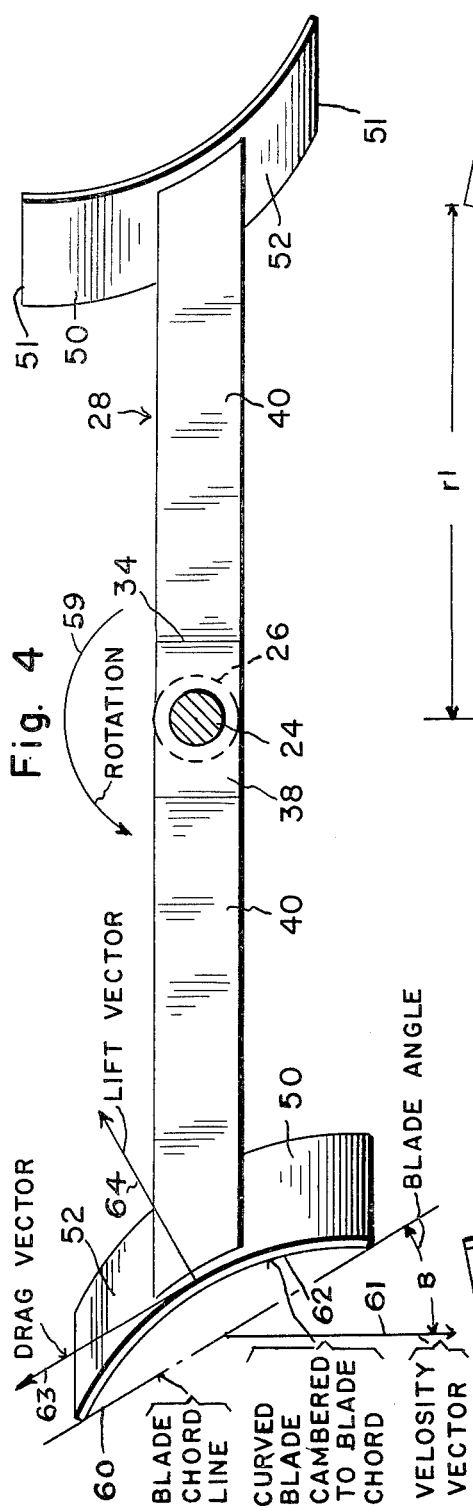
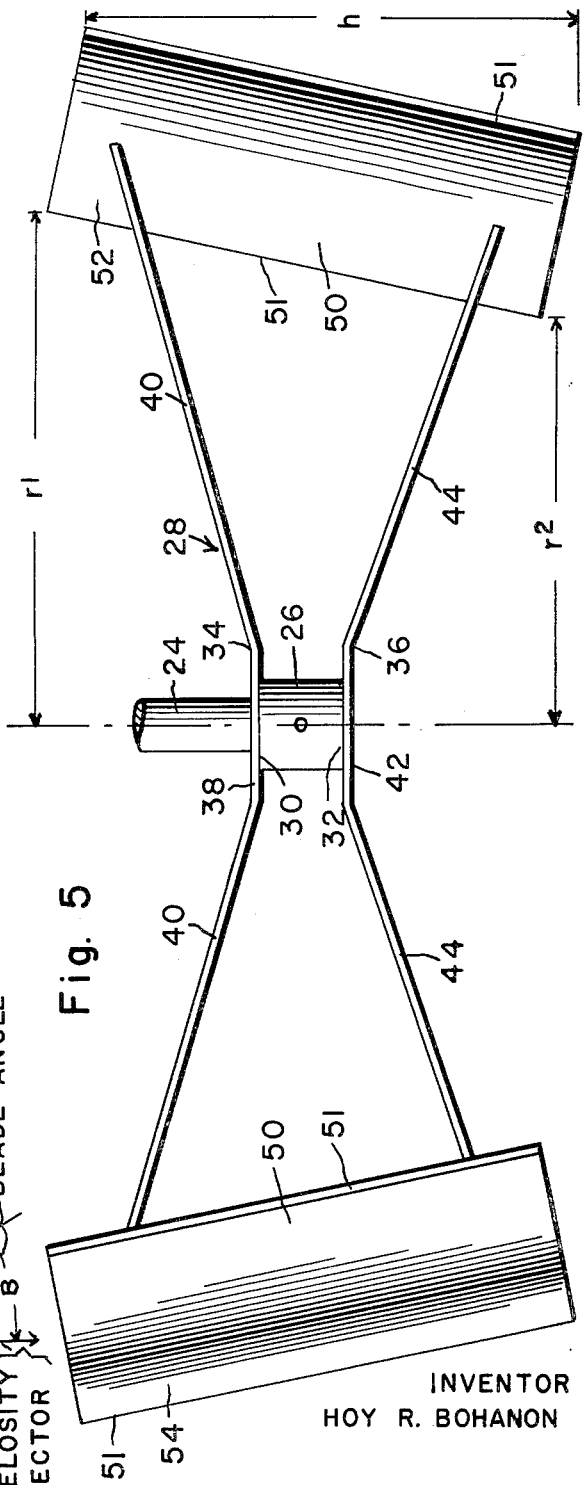

United States Patent Office 3,051,072
Patented Aug. 28, 1962

3,051,072
AIR CIRCULATING AND MIXING FAN
Hoy R. Bohanon, 213 E. Broadway, Muskogee, Okla.
Filed Mar. 20, 1961, Ser. No. 96,738
8 Claims. (Cl. 98—40)

This invention relates to fans and more particularly to air circulating and mixing fans for circulating and mixing the air within greenhouses, rooms, and other building structures, to improve the atmospheric conditions therein.

An object of the invention is to provide an improved fan that is adapted to be mounted within a greenhouse, room, or other building structure, so that the air flows radially from the fan in a conical pattern in a substantially downwardly and outwardly direction.

Another object of the invention is to provide an improved means for continuously circulating air within a closed chamber to thereby properly ventilate the chamber.

Still another object of the invention is to provide an improved fan that is adapted to be mounted within a greenhouse and preferably in the gable portion thereof, the impeller of the fan having its blades so shaped and so disposed as to generate a radial flow of air around 360° with ample flow inlet areas top and bottom.

An additional object of the invention is to provide an improved fan of the above type which is designed to move large quantities of air at low velocities in a flat cone-shaped pattern.

A further object of the invention is to provide an improved fan of the above type which is designed to produce a large scale air motion over a wide area without drafts, airblasts, and dead spots.

Still another object of the invention is to provide an improved fan of the above type in which the impeller has two diametrically disposed blades arranged to produce small impulse air waves for more complete mixing and better air flow through the foliage of plants in the greenhouse.

An additional object of the invention is to provide an improved fan for circulating and mixing air in a greenhouse that is simple and practical in construction, strong and reliable in use, neat and attractive in appearance, inexpensive to manufacture, and otherwise well adapted for the purpose for which it is intended.

With these and other objects in view, which will become readily apparent from the following detailed description of the various unique, practical and illustrative improvements shown in the accompanying drawings, the present invention comprises the novel elements, features of construction and arrangement of parts in cooperative relationship, as more particularly indicated and defined by the hereto appended claims.

In the accompanying drawings:

FIG. 1 is a vertical transverse section of a greenhouse having installed therein an air circulating and mixing fan constructed according to the present invention;

FIG. 2 is a top edge view of one of the impeller blades of the fan shown in FIG. 1;

FIG. 3 is a face view of the impeller blade shown in FIG. 2;

FIG. 4 is a top view of the impeller of the fan as seen from the line 4—4 of FIG. 1; and FIG. 5 is a side elevation of the structure shown in FIG. 4.

Improved ventilating and cooling systems have been used with outstanding success by growers of flowers and vegetables in all parts of the United States and in many foreign countries to provide cooling and ventilating for their greenhouses during the summer months. The tremendous increases in quality, plant growth, and profits are well known throughout the horticultural trade.

Cooler temperatures and higher humidities during the summer months were not the only benefits obtained. Better ventilation, improved air movement, and a more uniform humidity were also important. It has been determined that these latter factors can be applied to greenhouse operations during colder weather with a suitable air circulator and mixer to provide uniform temperatures, reduced extremes in the humidity and provide adequate leaf surface ventilation.

By the present invention an improved type of greenhouse air circulator and mixer has been developed to provide better greenhouse climate conditions during the fall, winter and spring months to improve plant growth and health and thereby increase profits in these seasons.

Referring to the drawings, for the protection and cultivation of tender flowers and plants, the usual glass house or greenhouse 11, is generally rectangular in outline, and has walls 12, closed at the top by a roof 13, supported at the center by a ridge member 14.

Within the greenhouse 11, the plants 15 may be arranged on a series of trays 16. These trays 16 may be disposed in suitable spaced relationship and be supported a suitable distance above the floor 17, by legs 18 so that ample space is provided above, between, and below the plants through which air can circulate.

For the purpose of circulating air in the greenhouse 11, the present invention comprehends the provision of a fan, generally indicated at 20. This fan comprises a frame 21, suspended from the ridge member 14, by means of a bracket 22, so that the fan is located in the gable portion of the greenhouse.

A vertical shaft 24, rotatably mounted in the frame 21 and depending therefrom a suitable distance, has the hub 26 of a fan impeller 28 fixedly mounted on the lower end thereof.

The body of the impeller hub 26 may be generally in the form of a cylinder having a flat upper end surface 30 and a flat lower end surface 32.

Carried by the hub 26 is an upper bar 34 and a lower bar 36. The upper bar 34 has an intermediate section 38 fixedly secured by any suitable means, such as by welding, to the surface 30 of the hub 26. From the intermediate section 38 the bar 34 projects outwardly and upwardly in diametrically opposite directions to provide a pair of arms 40 of suitable length. In a similar manner the lower bar 36 has an intermediate section 42 fixedly secured by any suitable means, such as by welding, to the flat lower surface 32 of the hub 26. From the intermediate section 42 the bar 36 projects outwardly and downwardly in diametrically opposite directions to provide a pair of arms 44 of suitable length. As shown in FIG. 5, the construction and arrangement of the parts is such that the upper arms 40 diverge at such an angle with respect to the lower arms 44, that the outer extremities of said upper and lower arms are spaced apart a considerable distance in excess of the distance separating the intermediate sections of the arms which are mounted on the hub 26. It will also be noted that the length of the upper arms 40 is greater than the length of the lower arms 44, for a purpose to be hereinafter more fully described. As shown in FIG. 4, the arms 40 of the upper bar 34 are arranged in a vertical plane above the arms 44 of the lower bar 36.

An impeller blade 50 is fixedly mounted on the extremities of each pair of arms 40 and 44, by any suitable means, such as by welding. Thus the impeller comprises a pair of diametrically disposed blades.

Each blade 50 is preferably formed of a substantially rectangular piece of sheet metal of suitable gauge, bent transversely the length thereof to provide an arcuate plate. Thus each blade 50 may be in the form of a longitudinal section of a cylinder having substantially parallel side edges 51, a convex surface at one side thereof, and a concave surface 54 at the opposite side thereof to which the ends of the arms 40 and 44 are fixedly secured by any suitable means, such as by welding.

Referring to FIGS. 4 and 5, since the impeller 28 is designed to rotate in the counterclockwise direction indicated by arrow 59, to move large quantities of air at low velocities in a flat cone-shaped or radial flow pattern, so as to produce a large scale air motion over a wide area without drafts, airblasts, and dead spots, the blades 50 should be arranged at predetermined angles with respect to the vertically disposed shaft 24.

In FIG. 4, the blade chord is indicated by line 60, from which line the blade angle B may be from 10° to 30° with respect to the velocity vector, indicated by line 61. The curved blade surface 52 is cambered to the blade chord, as indicated at 62. Arrow 63 indicates the drag vector and arrow 64 indicates the lift vector.

In actual practice it has been determined that in order to have efficient radial flow of air in accordance with the purposes of the present invention, the impeller 28 should have the following characteristics:

(1) Angle inlet flow area (see FIG. 5):

$$\pi(r_1^2 + r_2^2) \geq 2\pi \left(\frac{r_1 + r_2}{2}\right) h$$

(2) Blade angle B (FIG. 4) from 10° to 30°.
(3) Aspect ratio (FIGS. 2 and 3).

$$\frac{a}{b} \geq 1.5$$

(4) Proper value of blade chord and number of blades for given blade angle B, $n$=number of blades.

$$\frac{nb}{2\pi r} = 2 \tan^2 B \text{ (approx.)}$$

(5) Blade camber from 4% to 8% (slightly modified by $b/r$ ratio).

For rotating the impeller 28, an electric motor 70, mounted on the frame 21, has a shaft 71 provided with a pulley 72. Mounted on the shaft 24, is a pulley 74. An endless belt 75, trained over the pulleys 72 and 74, drives the impeller 28 at the speed selected in accordance with the amount of air to be moved. It will be understood that the driving connection from the electric motor 70 to the impeller 28 may comprise means for changing the rotary speed of the impeller 28 to obtain the desired movement of air within the greenhouse 11. During operation of the device the pulsating action of the two-bladed impeller 28 produces small impulse air waves (approximately 1400 impulses per minute) for more complete mixing and better air flow through the foliage of the plants 15. As shown by the arrows, FIG. 1, due to the angular arrangement of the fan blades 50, air flows radially from the fan in a conical pattern substantially parallel to the roof 13 of the greenhouse 11, in a downward direction toward the plants 15 on the trays 16. It will be noted that, due to the wide distance in which the blades 50 are spaced from the hub 26 of the impeller 28 and the wide inlet areas at the top and bottom of the impeller, air will be forced in a radial direction around 360°, with ample flow areas top and bottom to which the air returns for recirculation.

A significant feature of the present device is that it utilizes existing greenhouse heating equipment and the humidity furnished by nature to provide a better climate for plant growth. Today's greenhouses are well equipped to supply adequate heat, while the soil and plants provide the moisture for the humidity. The fan 20 provides air circulation and mixing means to produce more uniform temperatures and humidities and adequate leaf surface ventilation. The mixing action produced by the fan evens out the temperature from floor to ridge, thereby eliminating cold and hot spots in the greenhouse. As the result the existing heating system is made more efficient and effective. The sweeping air movements produced by the fan 20 eliminates excessive humidity within heavy foliage areas, and the natural humidity produced by the plants and soil is blended with less humid air at the gable to provide uniform humidity throughout the greenhouse. Plants must breathe to carry on the process of respiration, transpiration and photosynthesis. Outdoor plants have natural winds and breezes to perform this function. But during the colder weather when a greenhouse is virtually closed in, there is not sufficient air movement among the plants to permit the maximum growth rate. Thus the present invention is designed to provide a better greenhouse climate, by which the plants will have a more vigorous growth, and fungus diseases will be eliminated.

Although in the foregoing description the improved fan has been shown in a greenhouse, it will be understood that the application of the device to such a structure is merely for illustrative purposes, and that the device can be installed in other types of buildings, rooms, closed chambers, or the like, in which it is desired to improve the atmospheric conditions by air circulating and mixing means embodying the present invention.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiment is therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What I claim is:

1. An air circulating and mixing device for a greenhouse having an inclined roof providing a gable, comprising a fan mounted in the gable portion of the greenhouse, said fan having a shaft rotatable about a vertical axis, a pair of upper and lower bars having arms projecting diametrically in opposite directions from said shaft, an arcuate impeller blade mounted on the outer ends of each pair of said arms and arranged in spaced angular relationship with respect to said shaft and with respect to each other so that the velocity vector of each blade is substantially at an angle of approximately 90° with respect to the longitudinal center lines of said arms and the chord line of each blade it at an angle of from 10° to 30° less than the angle of the velocity vector with respect to the longitudinal center lines of said arms, and means for driving said shaft to cause the impeller to generate a substantially radial flow of air in a direction toward the inclined roof so as to produce a dispersion of air over a wide area within the greenhouse.

2. A fan of the type described comprising a shaft having a hub, an upper bar carried by the upper portion of said hub and having arms of predetermined length extending in diametrically opposite directions from said hub, a lower bar carried by the lower portion of said hub and having arms of a length less than the length of the upper arms extending in diametrically opposite directions from said hub, the arms of the upper bar being arranged in a vertical plane above the arms of the lower bar, and an arcuate impeller blade formed of sheet metal in the form of a longitudinal section of a cylinder having its convex surface fastened to the outer ends of each pair of said upper and said lower arms whereby said blades are arranged at an angle with the vertical axis of said shaft and are spaced a wide distance from said hub to provide wide inlet areas at the top and bottom of the impeller.

3. A fan of the type described comprising a shaft having a hub of predetermined height, an upper bar carried by the upper portion of said hub and having arms of predetermined length extending upwardly at an angle and projecting diametrically in opposite directions therefrom, a lower bar carried by the lower portion of said hub and having arms of a length less than the length of the upper arms extending downwardly at an angle and projecting diametrically in opposite directions therefrom, the arms of the upper bar being arranged in a vertical plane above the arms of the lower bar and the outer portions of the pair of arms at each side of the hub being spaced apart a distance greater than the height of said hub, and an arcuate impeller blade formed of sheet metal in the form of a longitudinal section of a cylinder having its convex surface fastened to the outer ends of each pair of said upper and lower arms whereby said blades are spaced a wide distance from the hub to provide wide inlet areas at the top and bottom of the impeller.

4. A fan of the type described comprising a shaft having a hub, an upper bar carried by said hub and having arms extending diametrically in opposite directions therefrom, a lower bar carried by said hub and having arms extending diametrically in opposite directions therefrom, the arms of the upper bar being arranged in a vertical plane above the arms of the lower bar and the outer portions of the pair of arms at each side of the hub being spaced apart a distance greater than the height of said hub, and arcuate impeller blades formed of sheet metal, each in the form of a longitudinal section of a cylinder having substantially parallel side edges and having their convex surfaces fastened to the outer ends of each pair of said arms, said blades having the chord line of their convex surface arranged at an angle with respect to the longitudinal center line of said arms so that a substantially cone-shaped radial flow of air is generated when the fan is rotated.

5. A fan of the type described comprising a shaft having a hub of predetermined height, an upper bar carried by the upper portion of said hub and having arms of predetermined length extending upwardly at an angle and projecting diametrically in opposite directions therefrom, a lower bar carried by the lower portion of said hub and having arms of a length less than the length of the upper arms extending downwardly at an angle and projecting diametrically in opposite directions therefrom, the arms of the upper bar being arranged in a vertical plane above the arms of the lower bar and the outer portions of the pair of arms at each side of the hub being spaced apart a distance greater than the height of the hub, and an arcuate impeller blade in the form of a longitudinal section of a cylinder having its convex surface fastened to the outer ends of a pair of said arms and having the chord line of its convex surface arranged at an angle less than 90° with respect to the longitudinal center line of said arms whereby a substantially cone-shaped radial flow of air is generated when the fan is rotated.

6. A fan of the type described comprising a shaft having a hub of predetermined height, an upper bar carried by the upper portion of said hub and having arms of predetermined length extending upwardly at an angle and projecting diametrically in opposite directions in a straight line therefrom, a lower bar carried by the lower portion of said hub and having arms of a length less than the length of the upper arms extending downwardly at an angle and projecting diametrically in opposite directions in a straight line therefrom, the arms of the upper bar being arranged in a vertical plane above the arms of the lower bar and the outer portions of the pair of arms at each side of the hub being spaced apart a distance greater than the height of said hub, and an arcuate impeller blade formed of sheet metal in the form of a longitudinal section of a cylinder having its convex surface fastened to the outer ends of a pair of said arms whereby said blades diverge outwardly from the shaft toward their upper ends, said blades having a chord line of their convex surface arranged at an angle less than 90° with respect to the longitudinal center line of said arms so that a substantially radial flow of air is generated when the fan is rotated.

7. A fan of the type described comprising a rotatable shaft, a hub mounted on said shaft, said hub being in the form of a cylindrical body having flat top and bottom ends, an upper bar having an intermediate flat section mounted on the top flat surface of the hub, said upper bar having a pair of arms projecting outwardly and upwardly in diametrically opposite directions from the hub, a lower bar having an intermediate flat surface mounted on the bottom flat surface of the hub, said lower bar having a pair of arms projecting outwardly and downwardly in diametrically opposite directions from the hub and being arranged in a vertical plane beneath the arms of the upper bar, and an impeller blade mounted on the extremities of a pair of each said arms.

8. A fan of the type described comprising, a rotatable shaft, a hub mounted on said shaft, said hub being in the form of a cylindrical body having flat top and bottom ends, an upper bar having an intermediate flat section mounted on the top flat surface of the hub, said upper bar having a pair of arms projecting outwardly and upwardly in diametrically opposite directions from the hub for a predetermined distance, a lower bar having an intermediate flat section mounted on the bottom flat surface of said hub, said lower bar having a pair of arms projecting outwardly and downwardly in diametrically opposite directions from the hub for a distance less than the length of said upper arms whereby the outer extremities of said arms are spaced apart a distance greater than the height of the body of said hub, and an impeller blade of sheet metal in the form of a section of a cylinder mounted on the extremities of a pair of each said arms and arranged at an angle with respect to the axis of said shaft.

References Cited in the file of this patent
UNITED STATES PATENTS

| | | |
|---|---|---|
| 1,501,201 | Cates | July 15, 1924 |
| 1,699,201 | Guth | Jan. 15, 1929 |